United States Patent
Nash et al.

(10) Patent No.: US 10,508,550 B2
(45) Date of Patent: Dec. 17, 2019

(54) GEARED GAS TURBINE ENGINE

(71) Applicant: United Technologies Corporation, Farmington, CT (US)

(72) Inventors: Timothy Charles Nash, Vernon, CT (US); Loubriel Ramirez, Utuado, PR (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 170 days.

(21) Appl. No.: 15/793,454

(22) Filed: Oct. 25, 2017

(65) Prior Publication Data
US 2019/0120059 A1   Apr. 25, 2019

(51) Int. Cl.
| F01D 5/14 | (2006.01) |
| F04D 29/68 | (2006.01) |
| F04D 29/52 | (2006.01) |
| F01D 9/04 | (2006.01) |

(52) U.S. Cl.
CPC ............. *F01D 5/145* (2013.01); *F01D 5/143* (2013.01); *F04D 29/68* (2013.01); *F01D 9/041* (2013.01); *F04D 29/522* (2013.01); *F05D 2240/12* (2013.01)

(58) Field of Classification Search
CPC ........ F01D 5/143; F01D 5/145; F04D 29/681; F05D 2240/80
See application file for complete search history.

(56) References Cited

U.S. PATENT DOCUMENTS

| 4,677,828 A | 7/1987 | Matthews et al. |
| 7,354,243 B2* | 4/2008 | Harvey .................. F01D 5/143 |
| | | 415/191 |
| 8,459,956 B2* | 6/2013 | Pandey .................. F01D 5/143 |
| | | 416/190 |
| 9,334,745 B2 | 5/2016 | Miyoshi et al. |
| 9,726,197 B2 | 8/2017 | Boniface et al. |
| 2011/0044818 A1 | 2/2011 | Kuhne et al. |

(Continued)

FOREIGN PATENT DOCUMENTS

| DE | 102010033708 | 2/2012 |
| EP | 2505851 | 10/2012 |

(Continued)

OTHER PUBLICATIONS

The Extended European Search Report for EP Application No. 18202713.6, dated Apr. 15, 2019.

*Primary Examiner* — Ninh H. Nguyen
(74) *Attorney, Agent, or Firm* — Carlson, Gaskey & Olds, P.C.

(57) ABSTRACT

An airfoil array includes an endwall. A first airfoil and a second airfoil each extend radially from the endwall and have a first side and an opposite second side that extends along an axially chord between a leading edge and a trailing edge. A first profiled region is recessed into the endwall along the first side of the first airfoil. A second profiled region protrudes from the endwall approximately equidistant from the first side of the first airfoil and the second side of the second airfoil. A third profiled region is recessed into the endwall along adjacent the leading edge of the second side of the second airfoil. The third profiled region is at least partially axially aligned with the second profiled region.

20 Claims, 3 Drawing Sheets

(56) References Cited

U.S. PATENT DOCUMENTS

| | | | |
|---|---|---|---|
| 2014/0348660 A1* | 11/2014 | Guendogdu | F01D 5/145 416/242 |
| 2015/0044038 A1* | 2/2015 | Gier | F01D 5/142 415/192 |
| 2017/0089203 A1 | 3/2017 | Lohaus | |
| 2017/0218769 A1 | 8/2017 | Venugopal et al. | |

FOREIGN PATENT DOCUMENTS

| | | |
|---|---|---|
| EP | 2642075 | 9/2013 |
| WO | 2013009449 | 1/2013 |

* cited by examiner

GEARED GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Some sections of the engine, such as the compressor and turbine section, include arrays of airfoils circumferentially spaced from each other forming fluid flow passages between adjacent airfoils for air to pass. The fluid flow passages are established by adjacent airfoils projecting from laterally extending endwalls. Near the endwalls, the fluid flow is dominated by a flow phenomenon known as a horseshoe vortex, which forms as a result of the endwall boundary layer separating from the endwall as the gas approaches the leading edges of the airfoils. The separated gas reorganizes into the horseshoe vortex. There is a loss of efficiency associated with the vortex, and this loss is referred to as "secondary" or endwall loss. Accordingly, there exists a need for a way to mitigate or reduce endwall losses.

SUMMARY

In one exemplary embodiment, an airfoil array includes an endwall. A first airfoil and a second airfoil each extend radially from the endwall and have a first side and an opposite second side that extends along an axially chord between a leading edge and a trailing edge. A first profiled region is recessed into the endwall along the first side of the first airfoil. A second profiled region protrudes from the endwall approximately equidistant from the first side of the first airfoil and the second side of the second airfoil. A third profiled region is recessed into the endwall along adjacent the leading edge of the second side of the second airfoil. The third profiled region is at least partially axially aligned with the second profiled region.

In a further embodiment of any of the above, the first profiled region extends approximately 100% of the axial chord.

In a further embodiment of any of the above, the first profiled region extends approximately 30% of the pitch between the first airfoil and the second airfoil.

In a further embodiment of any of the above, the first profiled region includes a lower most surface located in a forward 30% of the axial chord.

In a further embodiment of any of the above, the second profiled region extends along approximately a forward 30% of the axial chord and extends along approximately 30% of the pitch between the first airfoil and the second airfoil.

In a further embodiment of any of the above, the third profiled region extends along approximately a forward 30% of the axial chord and extends along approximately 30% of the pitch between the first airfoil and the second airfoil.

In a further embodiment of any of the above, a fourth profiled region protrudes from the endwall along the second side of the second airfoil downstream from the third profiled region.

In a further embodiment of any of the above, a fifth profiled region protrudes from the endwall along the first side of the first airfoil upstream of the first profiled region.

In a further embodiment of any of the above, the fourth profiled region extends along approximately an aft 50% axial chord and extends along approximately 50% of the pitch between the first airfoil and the second airfoil.

In a further embodiment of any of the above, the fifth profiled region extends along approximately a forward 10% of the axial chord and extends along approximately 10% of the pitch between the first airfoil and the second airfoil.

In another exemplary embodiment, a gas turbine engine includes a compressor section. A turbine section is located downstream of the compressor section. At least one of the compressor section or the turbine section includes an array of airfoils including an endwall. A first airfoil and a second airfoil each extend radially from the endwall and have a first side and an opposite second side that extend along an axially chord between a leading edge and a trailing edge. A first profiled region is recessed into the endwall along the first side of the first airfoil. A second profiled region protrudes from the endwall approximately equidistant from the first side of the first airfoil and the second side of the second airfoil. A third profiled region is recessed into the endwall along adjacent the leading edge of the second side of the second airfoil. The third profiled region is at least partially axially aligned with the second profiled region.

In a further embodiment of any of the above, the first profiled region extends approximately 100% of the axial chord.

In a further embodiment of any of the above, the first profiled region extends approximately 30% of the pitch between the first airfoil and the second airfoil.

In a further embodiment of any of the above, the first profiled region includes a lower most surface located in a forward 30% of the axial chord.

In a further embodiment of any of the above, the second profiled region extends along approximately a forward 30% of the axial chord and extends along approximately 30% of the pitch between the first airfoil and the second airfoil.

In a further embodiment of any of the above, the third profiled region extends along approximately a forward 30% of the axial chord and extends along approximately 30% of the pitch between the first airfoil and the second airfoil.

In a further embodiment of any of the above, a fourth profiled region protrudes from the endwall along the second side of the second airfoil downstream from the third profiled region.

In a further embodiment of any of the above, a fifth profiled region protrudes from the endwall along the first side of the first airfoil upstream of the first profiled region.

In a further embodiment of any of the above, the fourth profiled region extends along approximately an aft 50% axial chord and extends along approximately 50% of the pitch between the first airfoil and the second airfoil.

In a further embodiment of any of the above, the fifth profiled region extends along approximately a forward 10% of the axial chord and extends along approximately 10% of the pitch between the first airfoil and the second airfoil.

DETAILED DESCRIPTION

Figure 1:
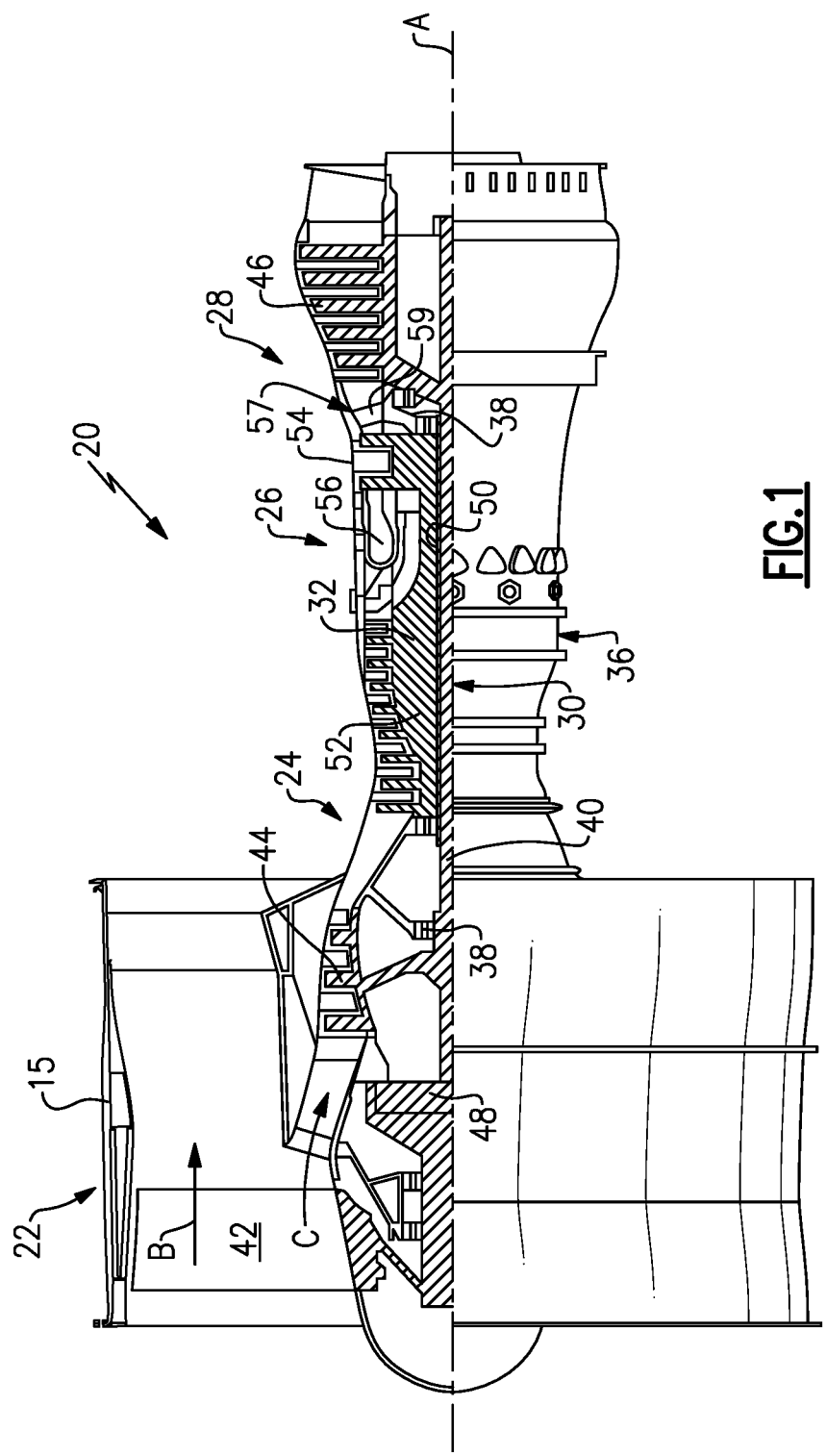
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
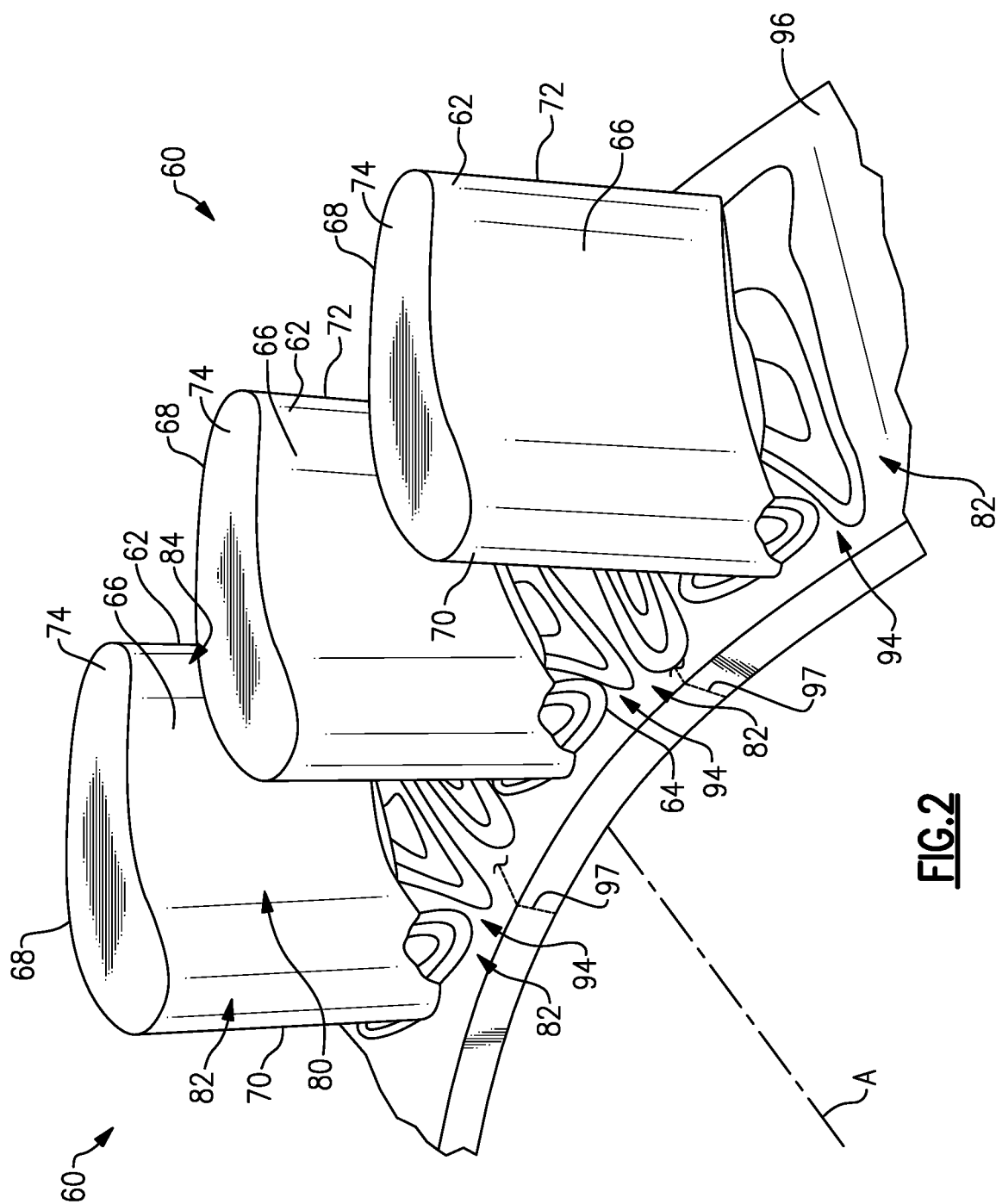
FIG. 2 is a perspective view of an airfoil array located within the example gas turbine engine of FIG. 1.

FIG. 2 illustrates an example array of airfoils 60. The array of airfoils 60 could be located in at least one of the compressor section 24 and the turbine section 28 of the gas turbine engine 10. The array of airfoils 60 includes multiple airfoils 62 extending radially from an endwall 64. In the illustrated example, the airfoils 62 extend radially outward from a radially inner end of the airfoils 62 to an unshrouded radially outer end. Although the airfoils 62 in the illustrated example are unshrouded on radially outer ends, the airfoils 62 could be shrouded on a radially outer end by another similar endwall spaced opposite the endwall 64.

Each of the airfoils 62 include a first side 66 or pressure side and a second side 68 or suction side. The first side 66 is separated from the second side 68 by a leading edge 70 and a trailing edge 72. In the illustrated example, the radially outer end of the airfoil 62 includes a blade tip 74. The first side 66 of one of the airfoils 62 is spaced a distance D from a second side 68 of an adjacent airfoil 62. The distance D corresponds to a pitch of the airfoils 62. Relevant distances are expressed as a percentage of the distance D or pitch of the airfoils 62. The first side 66, the second side 68, and the endwall 64 at least partially define a fluid flow passage 80 having an inlet 82 adjacent the leading edges 70 and an outlet 84 located adjacent the trailing edges 72.

Figure 3:
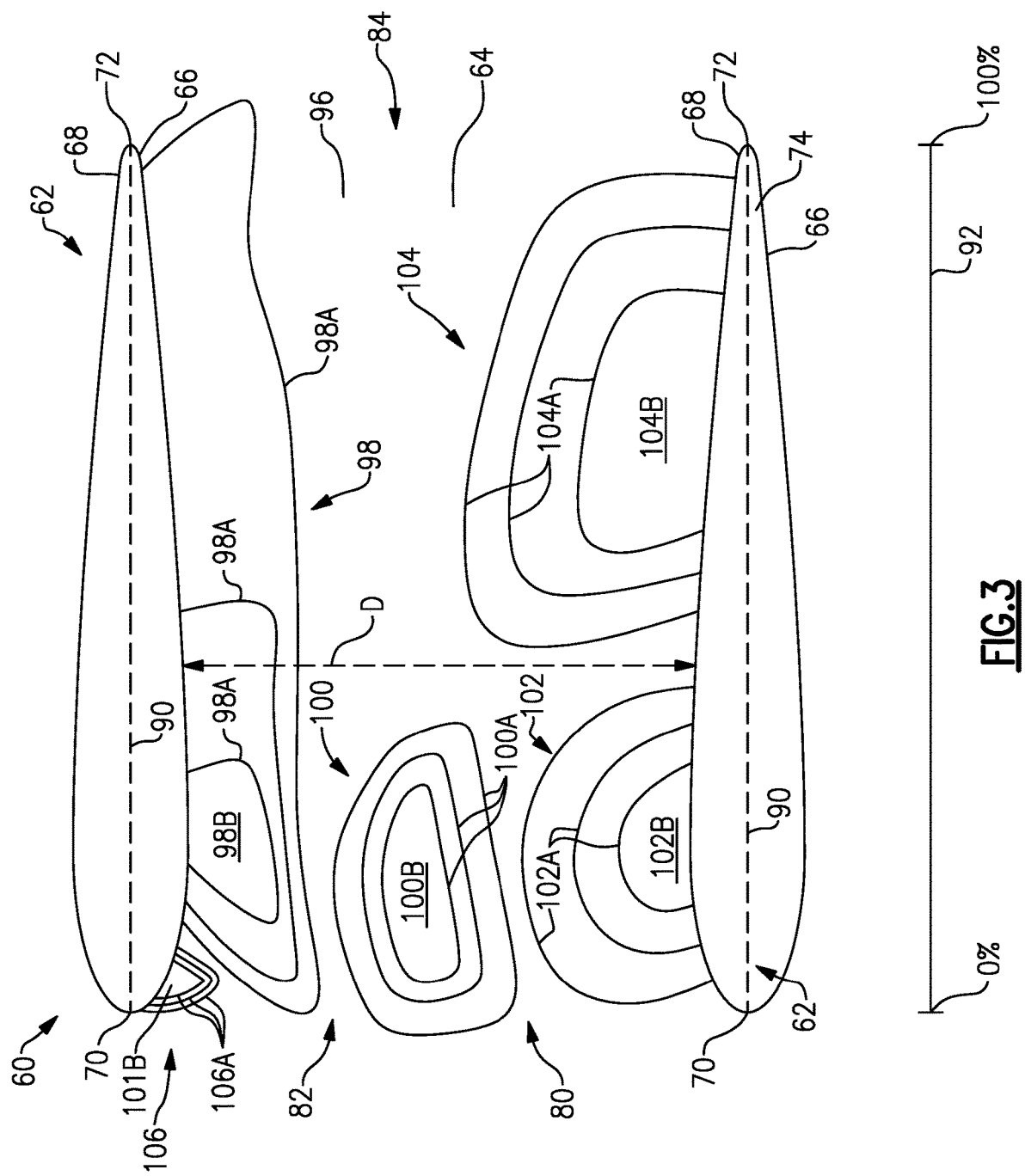
FIG. 3 is a plan view with topographical contours showing a portion of the airfoil array of FIG. 3.

As shown in FIGS. 2 and 3, each airfoil 62 includes a chord 90, which is defined as a line from the leading edge 70 to the trailing edge 72. An axial chord 92 is defined as a projection of the chord 90 onto a plane containing the engine central longitudinal axis A. In the illustrated example, the axial chord 92 to the same for each of the airfoils 62. Relevant distances relative the axial chord 92 are expressed as a percentage of the axial chord 92 with zero percent aligned with the leading edge 70 and 100% aligned with the trailing edge 72.

The endwall 64 includes a plurality of profiled regions 94 that are either recessed into a surface 96 of the endwall 64 facing the array of airfoils 62 or protruding from the surface 96 of the endwall 64. The endwall 64 can be a single ring or be formed by collecting multiple segments separate at edges 97. The profiled regions 94 improve the flow of the fluid passing through the fluid flow passage 80 adjacent the endwall 64. Elevation lines represent relative units of distance in the radial direction to provide relative sizes of the profiled regions 94.

A first profiled region 98 is located in the endwall 64 adjacent the first side 66 of a first airfoil 62. In the illustrated example, the first profiled region 98 is defined by three elevation lines 98A indicating a recessed profile into the surface 96. Alternatively, the relative depth of the recess of the first profiled region 98 could be defined by more or less than three elevations lines. However, at least one elevation line would be required to represent a change in elevation in the surface 96 of the endwall 64.

Moreover, the first profiled region 98 extends approximately 30% of the distance D or pitch from the first side 66 of the first airfoil 62 towards the second side 68 of a second airfoil 62. The first profiled region 98 also extends along approximately 100% of the axial chord 92. In the illustrated example, the first profiled region 98 extends a distance greater than the axial chord 92 of the airfoils 62.

Surface 98B defines a lower most portion of the first profiled region 98 and is located in a forward 30% of the axial chord 92. By locating the surface 98B in the forward 30% of the axial chord 92, a forward portion of the first profiled region 98 upstream of the surface 98B includes a greater slope than an aft portion of the first profiled region downstream of the surface 98B. The increased slop of the forward portion of the first profiled region 98 is indicated by the closer distance between the elevation lines 98A in the forward portion compared to the distance between the elevation lines 98A in the aft portion.

A second profiled region 100 is located in the endwall 64 approximately equidistant from the first side 66 of the first airfoil 62 and the second side 68 of the second airfoil 62. In the illustrated example, the second profiled region 100 is defined by three elevation lines 100A indicating a protruding profile from the surface 96.

Surface 100B defines an outer most portion of the second profiled region 100. Alternatively, the relative height of the protrusion of the second profiled region 100 could be defined by more or less than three elevations lines. However, at least one elevation line 100A would be required to represent a change in elevation in the surface 96 of the endwall 64.

Moreover, the second profiled region 100 extends along approximately 30% of the distance D or pitch between the first side 66 of the first airfoil 62 and the second side 68 of the second airfoil 62. Circumferential edges of the second profiled region 100 are spaced approximately 30% of the distance D or pitch from first side 66 and second side 68, such that the second profiled region 100 is located approximately equidistant from the first side 66 and the second side 68. The second profiled region 100 is also located in the first 30% of the axial chord 92 such that the second profiled region 100 is biased towards the leading edges 70 of the airfoils 62.

A third profiled region 102 is located in the endwall 64 adjacent the second side 68 of the airfoil 62. In the illustrated example, the third profiled region 102 is defined by three elevation lines 102A indicating a recessed profile into the surface 96.

Surface 102B defines a lower most portion of the third profiled region 102. Alternatively, the relative depth of the recess of the third profiled region 102 could be defined by more or less than three elevations lines. However, at least one elevation line would be required to represent a change in elevation in the surface 96 of the endwall 64.

Moreover, the third profiled region 102 extends approximately 30% of the distance D or pitch from the second side 68 towards the first side 66. The third profiled region 102 is also located in the forward 30% of the axial chord 92 such that the third profiled region 102 is biased towards the leading edge 70 of the airfoil 62. In the illustrated example, the first, second, and third profiled regions 98, 100, and 102 create a recessed, protruding, and recessed geometry along the endwall 64 at the inlet 82 to the fluid flow passage 80.

A fourth profiled region 104 is located in the endwall 64 adjacent the second side 68 of the airfoil 62. In the illustrated example, the fourth profiled region 104 is defined by three elevation lines 104A indicating a protruding profile out of the surface 96. Surface 104B defines a highest most portion of the fourth profiled region 104. Alternatively, the relative height of the protrusion of the fourth profiled region 104 could be defined by more or less than three elevations lines. However, at least one elevation line would be required to represent a change in elevation in the surface 96 of the endwall 64.

Moreover, the fourth profiled region 104 extends approximately 50% of the distance D or pitch from the second side 68 of the second airfoil towards the first side 66 of the first airfoil 62. The fourth profiled region 104 extends approximately the aft 50% of the axial chord 92 such that the fourth profiled region 104 is biased towards the trailing edge 72 of the airfoil 62.

A fifth profiled region 106 is located in the endwall 64 adjacent the first side 66 of the first airfoil 62 and at least partially axially aligned with the first, second, and third profiled regions 98, 100, 102 and axially spaced from the fourth profiled region 104. In the illustrated example, the fifth profiled region 106 is defined by three elevation lines 106A indicating a protruding profile out of the surface 96.

Surface 106B defines an upper most portion of the fifth profiled region 106. Alternatively, the relative height of the protrusion of the fifth profiled region 106 could be defined by more or less than three elevations lines. However, at least one elevation line would be required to represent a change in elevation in the surface 96 of the endwall 64.

Moreover, the fifth profiled region 106 extends approximately 10% of the distance D or pitch from the first side 66 of the first airfoil 62 towards the second side 68 of the second airfoil 62. The fifth profiled region 106 is also located in a forward 10% of the axial chord 92 such that the fifth profiled region 106 is biased towards the leading edge 70 of the airfoil 62.

In the illustrated example, a forward most edge of the first profiled region 98 extends from the first side 66 of the first airfoil 62 axially forward along the endwall 64 to a location axially forward of a leading edge portion of the fifth profiled region 106 such that the first profiled region 98 at least partially surrounds the fifth profiled region.

Although the profiled regions 94 are only shown between two adjacent airfoils 62, the profiled regions 94 could be located between each of the airfoils 62 in the array 60.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil array comprising:
   an endwall;
   a first airfoil and a second airfoil each extending radially from the endwall and having a first side and an opposite second side extending along an axially chord between a leading edge and a trailing edge;
   a first profiled region recessed into the endwall at an intersection with the first side of the first airfoil;
   a second profiled region protruding from the endwall approximately equidistant from the first side of the first airfoil and the second side of the second airfoil; and
   a third profiled region recessed into the endwall along adjacent the leading edge of the second side of the second airfoil, wherein the third profiled region is at least partially axially aligned with the second profiled region.

2. The array of claim 1, wherein the first profiled region extends approximately 100% of the axial chord.

3. The array of claim 2, wherein the first profiled region extends approximately 30% of the pitch between the first airfoil and the second airfoil.

4. The array of claim 3, wherein the first profiled region includes a lower most surface located in a forward 30% of the axial chord.

5. The array of claim 1, wherein the third profiled region extends along approximately a forward 30% of the axial chord and extends along approximately 30% of the pitch between the first airfoil and the second airfoil.

6. The array of claim 1, including a fourth profiled region protruding from the endwall along the second side of the second airfoil downstream from the third profiled region.

7. The array of claim 6, including a fifth profiled region protruding from the endwall along the first side of the first airfoil upstream of the first profiled region.

8. The array of claim 7, wherein the fourth profiled region extends along approximately an aft 50% axial chord and extends along approximately 50% of the pitch between the first airfoil and the second airfoil.

9. The array of claim 8, wherein the fifth profiled region extends along approximately a forward 10% of the axial chord and extends along approximately 10% of the pitch between the first airfoil and the second airfoil.

10. The array of claim 1, wherein the second profiled region extends along approximately a forward 30% of the axial chord and extends along approximately 30% of the pitch between the first airfoil and the second airfoil.

11. An airfoil array comprising:
    an endwall;
    a first airfoil and a second airfoil each extending radially from the endwall and having a first side and an opposite second side extending along an axially chord between a leading edge and a trailing edge;
    a first profiled region recessed into the endwall along the first side of the first airfoil;
    a second profiled region protruding from the endwall approximately equidistant from the first side of the first airfoil and the second side of the second airfoil, wherein the second profiled region extends along approximately a forward 30% of the axial chord and extends along approximately 30% of the pitch between the first airfoil and the second airfoil; and
    a third profiled region recessed into the endwall along adjacent the leading edge of the second side of the second airfoil, wherein the third profiled region is at least partially axially aligned with the second profiled region.

12. A gas turbine engine, comprising:
    a compressor section; and
    a turbine section located downstream of the compressor section, wherein at least one of the compressor section or the turbine section includes an array of airfoils including:
    an endwall;
    a first airfoil and a second airfoil each extending radially from the endwall and having a first side and an opposite second side extending along an axially chord between a leading edge and a trailing edge;
    a first profiled region recessed into the endwall along the first side of the first airfoil;
    a second profiled region protruding from the endwall approximately equidistant from the first side of the first airfoil and the second side of the second airfoil; and
    a third profiled region recessed into the endwall along adjacent the leading edge of the second side of the second airfoil, wherein the third profiled region is at least partially axially aligned with the second profiled region, wherein the third profiled region extends along approximately a forward 30% of the axial chord and extends along approximately 30% of the pitch between the first airfoil and the second airfoil.

13. The gas turbine engine of claim 12, wherein the first profiled region extends approximately 100% of the axial chord.

14. The gas turbine engine of claim 13, wherein the first profiled region extends approximately 30% of the pitch between the first airfoil and the second airfoil.

15. The gas turbine engine of claim 14, wherein the first profiled region includes a lower most surface located in a forward 30% of the axial chord.

16. The gas turbine engine of claim 12, wherein the second profiled region extends along approximately a forward 30% of the axial chord and extends along approximately 30% of the pitch between the first airfoil and the second airfoil.

17. The gas turbine engine of claim 12, including a fourth profiled region protruding from the endwall along the second side of the second airfoil downstream from the third profiled region.

18. The gas turbine engine of claim 17, including a fifth profiled region protruding from the endwall along the first side of the first airfoil upstream of the first profiled region.

19. The gas turbine engine of claim 18, wherein the fourth profiled region extends along approximately an aft 50% axial chord and extends along approximately 50% of the pitch between the first airfoil and the second airfoil.

20. The gas turbine engine of claim 19, wherein the fifth profiled region extends along approximately a forward 10% of the axial chord and extends along approximately 10% of the pitch between the first airfoil and the second airfoil.

* * * * *